March 29, 1960     C. H. FARMER     2,930,210
FLEXIBLE SHAFT COUPLING
Filed May 19, 1958
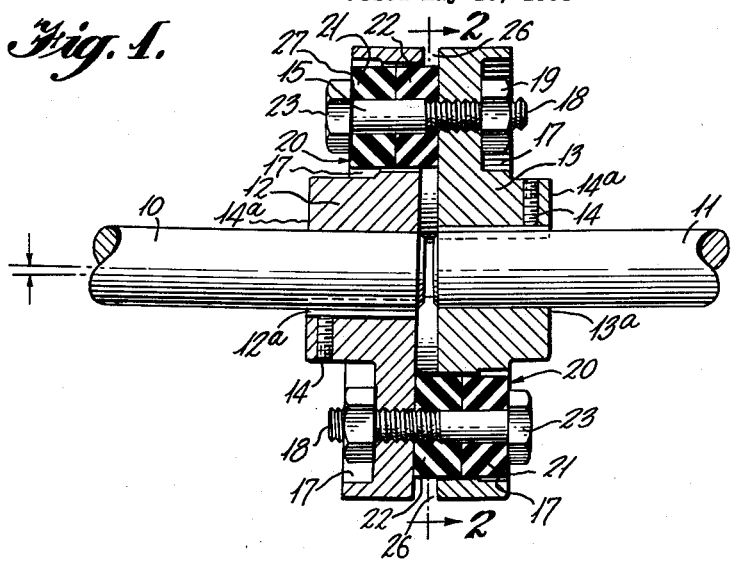
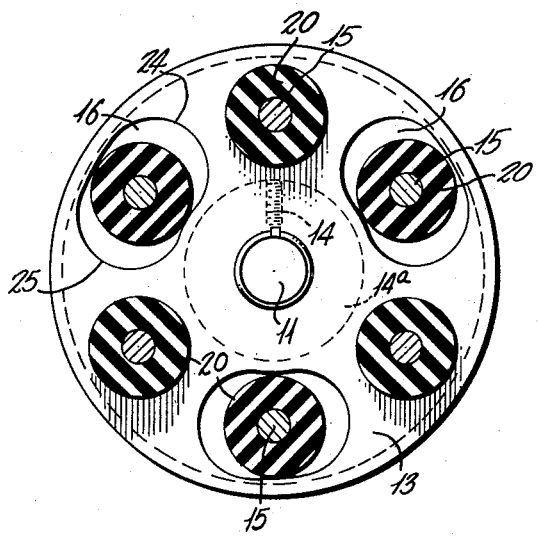
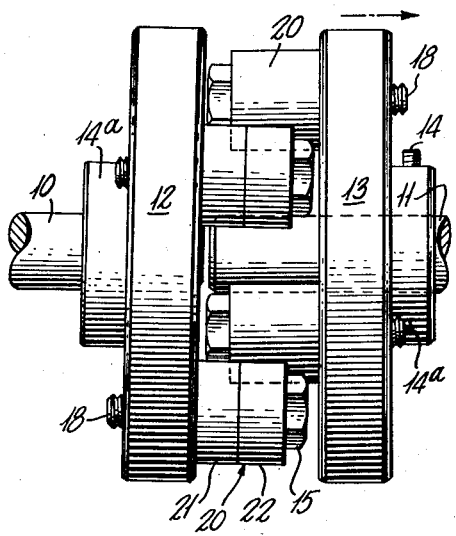
INVENTOR
Clyde H. Farmer
BY Mason, Fenwick & Lawrence
ATTORNEYS

United States Patent Office 2,930,210
Patented Mar. 29, 1960

2,930,210
FLEXIBLE SHAFT COUPLING
Clyde H. Farmer, Beckley, W. Va.

Application May 19, 1958, Serial No. 736,023

4 Claims. (Cl. 64—10)

This invention relates to flexible shaft couplings and more particularly to a flexible shaft coupling which can be easily and quickly disconnected and reconnected under conditions of severe shaft misalignment.

Flexible shaft couplings comprising a pair of matching flanges or collars each flange being attachable to the abutting ends of a driven shaft and driver shaft, respectively, with one of the flanges having a stud which is received in a metal sleeve surrounded by a rubber bushing secured in the other flange are well known. Some of the known couplings have all of the studs on one flange and all of the matching rubber bearings secured in the other flange while in other known couplings the studs and rubber bearings alternate in each flange.

All of the known flexible shaft couplings require a great deal of time and labor to disconnect and reconnect the shafting. This is due to the necessity of unbolting each of the studs as well as the set screws which hold the flange to the shaft. The time and labor required to remove a broken piece of machinery or a dead motor and replace it with an operative unit is costly when only the time of the workmen making the replacement is considered. This cost however cannot be compared with the loss of time of other employees and the loss of production suffered from the stoppage of operations resulting from the breakdown.

The number of flexible couplings used in a mining operation such as a coal mine, runs to several hundred such couplings, and the size of the couplings vary with the work loads on the shafting. The larger the load the greater the diameter of the coupling, and the greater the number of bolt studs which have to be unfastened.

The known couplings in use are very difficult to disassemble when they have been in use even for a short period of time, because the atmospheric conditions in a mine are such that the excessive moisture quickly corrodes the metal of the said bolt and sleeve in the rubber bushing and they must be driven apart. Also it is not within the strength of an average work man and his helper to reassemble a flexible coupling unless the shafts are at least in reasonably good alignment. Adjusting the shafts until they are in good axial alignment is a time consuming operation.

Veins in a coal mine are often as low as 27" and there is but little room for workmen to operate in disconnecting and reconnecting equipment.

Consequently, it is an object of the present invention to provide a flexible shaft coupling in which the couplings are quickly and easily disconnectible by simply loosening the set screws which secure a flange to one of the coupled shafts.

Another object of the invention is to provide a flexible coupling for connecting driver and driven shafts which are in severe misalignment whether the misalignment is due to abutment of the shaft ends at an angle less than 180° or in offset relationship.

Other objects and advantages of the present invention will become apparent to those skilled in the art from the following description when read in conjunction with the accompanying drawings wherein:

Fig. 1 is a vertical cross-section of the coupling of the present invention installed on shafts axially misaligned in that the axes of the shafts are offset with respect to each other and the ends of the shaft abut at an angle less than 180°;

Fig. 2 is a view taken on the line 2—2 of Fig. 1;

Fig. 3 is a side view of the coupling shown in Fig. 1 in which the set screws of one of the flanges of the coupling have been loosened and the flange has been retracted on the shaft, all of the rubber bearings being seated in place on the bolt studs.

Adverting now to the drawings, there is shown the meeting ends of a pair of misaligned shafts 10 and 11. A pair of circular flanges or collars 12 and 13 having shaft receiving bores 12a and 13a are mounted one at the end of each of the shafts 10 and 11, respectively, and releasably secured to the shafts by any suitable means such as one or more set screws 14, mounted in the hubs 14a. The flanges 12 and 13 are counterparts of each other.

A series of bolt studs 15 are threadedly mounted on the flanges 12 and 13 and spaced in alternation with a series of annularly disposed slotted bearings 16 adjacent the periphery of the flanges. For convenience in illustrating the invention, there are shown in the drawing three studs 15 and three slotted bearings 16 in each flange. It will be understood, however, that the number of studs and bearings would be increased in number in accordance with the amount of torque applied to the shafts.

Annular recesses 17 are provided on the outer face of the flanges, and the threaded portion 18 of the bolt studs 15 extend into the recesses. Lock nuts 19 are received on the threaded portions 18 to prevent loosening of the stud bolts 15. A resilient bushing 20 comprising a pair of collars or washers 21, 22 made of a tough deformable material, such as rubber, is mounted on each of the bolt studs 15, and the bolt heads 23 retain the bushings on the bolt studs and seat the bushings on the inner face of the flanges.

The bearing slots 16 are wider in a radial direction than the diameter of the bushings 20, and longer in an annular direction, with respect to said flange, than the diameter of the bushings. The width of the bearing slots 16 is approximately equal to the deformed diameter of the bushings 20 when they are under load, so that they will not bind in the bearing slots 16. The ends 24, 25 of the slots 16 are arcuate.

In use, one of the flanges, for example, the flange 12 is mounted near the end of the shaft 10 and fixed thereon by driving the set screw 14. The flange 13 is mounted on the shaft 11 and moved back from the end of the shaft. The shaft 11 is then approximately axially aligned with the shaft 10. The flange 13 is advanced on the shaft 11 and rotated if necessary until the bushings 20 will enter the bearing slots 16. This does not require a precise alignment, due to the length of the slots 16. Further advancement of the flange 13 toward the flange 12 will cause the bushings 20 of the flange 12 to enter the bearing slots 16 of the flange 12, and the bushings 20 of the flange 13 to enter the bearing slots 16 of the flange 12. The flange 13 is then fixed to the shaft near its end, by driving the set screw 14.

When torque is applied to one of the shafts, the bushings 20 move to one of the ends 24 or 25 of the slot 16, depending on the direction of the torque. The bushing 20 deforms into the said end of the slot 16, according to the amount of torque, but substantially one-half of the peripheral surface of the bushing is not in contact with the slot 16, and the air can circulate freely about this exposed portion of the bushing to dissipate heat which may be generated by friction between the surfaces of the bushing and slot which are in contact. The elongated annularly disposed slot 16 serves two purposes. It provides an area through which air moves across substantially one-half of the peripheral surface of the bushing when the coupling is in motion. The air would be drawn in through these slots and forced out through the space between the opposing faces of the flanges 12 and 13 at the periphery of these flanges. As shown in Figure 1, the length of the bushing 20 measured along its longitudinal axis is greater than the depth of the slot 16, measured along its longitudinal axis. The flanges 12 and 13 are not mounted at the extreme ends of the shafts, to prevent frictional contact at the faces of these flanges during rotation of the coupled shafts. The flange 13 is advanced toward the flange 12 until the surface 27 of the bushing 20 is in alignment with the surface of the outer rim 28 of the flange 12 at the point where the flanges approach each other the smallest distance in the case of angularly misaligned shafts. The flanges 12 and 13 would then never come into physical contact. Thus, the longitudinal length of the bushing 20 serves as a guide for spacing the flanges 12 and 13 of the coupling on the ends of the shafts 10 and 11.

The elongated annularly disposed slot 16 has a further advantage, in that it facilitates connecting the coupling in the case of severely misaligned shafts. In the example stated, the flange 13 is turned until a portion of one of the bushings 20 on each flange will enter a slot 16 of the other flange. This will occur at some point of rotation of the flanges, even where the shafts are severely misaligned. Then, by slowly rotating the shaft 10 which has fixed to it the flange 12, each of the bushings 20 will enter the corresponding slot 16 at the point where the initial connection was made.

The flexible coupling of the present invention is very economical to produce, inasmuch as it may be cast and does not require machining. The bolt studs 15 are commercially available machine bolts. The bushing washers 21 and 22 are also commercially available.

As described hereinbefore and shown in Figure 3, the flanges 12 and 13 of the coupling of the present invention are freely separable by loosening the set screws 14 holding one of the flanges to the shaft and sliding the flange axially along the shaft away from the other flange until the bolt studs 15 are free from the slots 16. In a mine where the replacement of some one of the motors, pumps or other pieces of equipment is necessary at frequent intervals the coupling flange set screws need not be removed at the time of replacement of equipment which has failed. All that is necessary is to remove the cap screws holding the defective piece of equipment to the platform on which it is mounted and to slide it with the flange still attached to its shaft away from the other flange on the shafting. For example, a defective motor and the flange on the motor shaft can be removed as a unit. A replacement motor with its coupling flange already attached to the motor shaft can be slid into position and when the motor is bolted to its platform the coupling of the motor with the driven shafting is completed and the mining operations proceed with a minimum of lost time.

The coupling of the present invention is very rugged, and one size of coupling will be used on 5 h.p. to 20 h.p. units. In fact, only 3 sizes will be required to cover all requirements of a mine having from 5 h.p. to 300 h.p. shaft loads.

While there has been disclosed in the foregoing description a practical embodiment of the flexible coupling in accordance with the present invention, it will be understood by those skilled in the art that variations in the implementation of the concept of the invention are within the purview and scope of the invention.

What is claimed is:

1. In a flexible shaft coupling having a pair of similar flanges for mounting one adjacent each of the abutting ends of driver and driven shafts to be coupled with their inner faces in confronting relation, the improvement comprising, in combination, a plurality of studs outstanding from the inner face of each flange, a resilient bushing mounted on each of said studs, each flange having a plurality of transverse bearing slots in its inner face disposed inwardly from the periphery of said flange, and each bearing slot being in registry with and adapted to receive one of said bushings mounted on the inner face of the other said flange in coupling relation.

2. In a flexible shaft coupling having a pair of similar flanges for mounting one adjacent each of the abutting ends of driver and driven shafts to be coupled and having means for releasably attaching said flanges in confronting relation on said respective shafts, the improvement comprising, in combination, a plurality of studs mounted in spaced relation on the confronting face of each flange intermediate a plurality of bearing slots spaced radially inwardly from the peripheries of said flanges, said studs and bearing slots being alternately spaced in an annular direction about the confronting faces of said flanges, resilient bushings mounted on said studs, and each of said bearing slots being in registry with and adapted to receive in coupling relation one of said bushings mounted on the confronting flange.

3. In a flexible shaft coupling having a pair of similar flanges for mounting one adjacent each of the abutting ends of driver and driven shafts to be coupled and having means for releasably attaching said flanges in confronting relation on said respective shafts, the improvement comprising, in combination, a plurality of studs mounted in spaced relation on the confronting face of each flange intermediate a plurality of bearing slots spaced radially inwardly from the peripheries of said flanges, said studs and bearing slots being alternately spaced in an annular direction about the confronting faces of said flanges, resilient cylindrical bushings mounted on said studs, each of said bearing slots being in registry with and adapted to receive in coupling relation one of said bushings mounted on the confronting flange, each of said bearing slots being elongated in an annular direction with respect to said flange face, and each of said slots having semicircular leading and trailing end portions to seat said cylindrical bushings during rotation of said shafts.

4. In a flexible shaft coupling having a flange with inner and outer faces for mounting on a driver shaft and a similar flange for mounting on a driven shaft and having means for fastening each of said flanges adjacent the respective abutting end of each of said shafts with their inner faces in confronting relation and having a plurality of studs mounted at one end to extend outwardly normal to the inner face of each of said flanges and spaced inward from the periphery of said flange and concentric therewith and each flange having a plurality of slots bridging the inner and outer faces of the flange and spaced to register with the studs on the confronting flange respectively in coupling relation the improvement comprising, in combination, a resilient bushing mounted on said stud, said stud having a cap on the end opposite its mounting end and being of substantially less diameter than said bushing so that the portion of said bushing extending beyond said cap will yieldably deform during insertion in said slot of the confronting flange, said slots being elongated in a direction concentric with the periphery of said flange, and said slots having semi-circular end portions matching semi-circular portions of said bushings to seat said bushings during rotation of said shafts.

References Cited in the file of this patent

UNITED STATES PATENTS

| | | |
|---|---|---|
| 710,524 | Scott | Oct. 7, 1902 |
| 764,103 | Baehr | July 5, 1904 |
| 1,200,143 | Schrade | Oct. 3, 1916 |
| 1,900,208 | Swank | Mar. 7, 1933 |